United States Patent
Watkins et al.

(10) Patent No.: US 7,111,095 B2
(45) Date of Patent: Sep. 19, 2006

(54) DATA TRANSFER DEVICE WITH DATA FRAME GRABBER WITH SWITCHED FABRIC INTERFACE WHEREIN DATA IS DISTRIBUTED ACROSS NETWORK OVER VIRTUAL LANE

(75) Inventors: Cory M. Watkins, Chanhassen, MN (US); Mark R. Harless, Plymouth, MN (US)

(73) Assignee: August Technology Corp., Bloomington, MN (US)

( * ) Notice: Subject to any disclaimer, the term of this patent is extended or adjusted under 35 U.S.C. 154(b) by 108 days.

(21) Appl. No.: 10/423,475

(22) Filed: Apr. 25, 2003

(65) Prior Publication Data

US 2003/0221042 A1 Nov. 27, 2003

Related U.S. Application Data

(60) Provisional application No. 60/375,321, filed on Apr. 25, 2002, provisional application No. 60/375,488, filed on Apr. 25, 2002, provisional application No. 60/375,366, filed on Apr. 25, 2002.

(51) Int. Cl.
*G06F 13/00* (2006.01)
*G06F 15/173* (2006.01)

(52) U.S. Cl. ............................. 710/72; 710/316; 710/62; 710/8; 710/9; 710/10; 709/253; 709/223; 709/201

(58) Field of Classification Search ............... 710/62, 710/8–10, 72, 316; 348/150; 709/253, 223, 709/201

See application file for complete search history.

(56) References Cited

U.S. PATENT DOCUMENTS

| 6,583,813 B1 * | 6/2003 | Enright et al. .............. 348/150 |
| 6,587,699 B1 * | 7/2003 | Olsen et al. ................ 342/359 |
| 2001/0040631 A1 * | 11/2001 | Ewedemi et al. ........... 348/294 |

OTHER PUBLICATIONS

Alacron, "The Alacron Fastimage 1500 Frame Grabber", Http://www.alacron.com/framegrabbers/FI1500.HTM.*
GigE-CameraLink—MegaCamera 10/100/1000 Eternet Interface, 1997-1999, www.siliconimaging.com/gige.htm.*
Vision Systems Design—Fiberoptic cables extend frame-grabber use—Dec. 2001, vsd.pennnet.com/Articles/Article_Display.cfm?Section=Articles&Subsection=Display&Article_ID=200582.*
InfiniBand, (Lab Notes), Sep. 2000, www.windowsitpro.com/Windows/Article/ArticleID/9658/9658.html.*
TeraVision: a Platform and Software independent Solution for Real Time Display Distribution in Advanced Collaborative Environments, 2002, www.accessgrid.org.*
"Switch Fabric Architecture", Jack Regula, PLX, Technology, Jan. 12, 2001, (http://www.busandboard.com/bab2001pres/jregula.pdf).*

* cited by examiner

*Primary Examiner*—Tammara Peyton
(74) *Attorney, Agent, or Firm*—Dicke, Billig & Czaja, PLLC

(57) ABSTRACT

A frame grabber with switched fabric interface where in varying embodiments the fabric interface may be one of InfiniBand, Star Fabric, or PCI Express or the like.

14 Claims, 7 Drawing Sheets

FIG 3

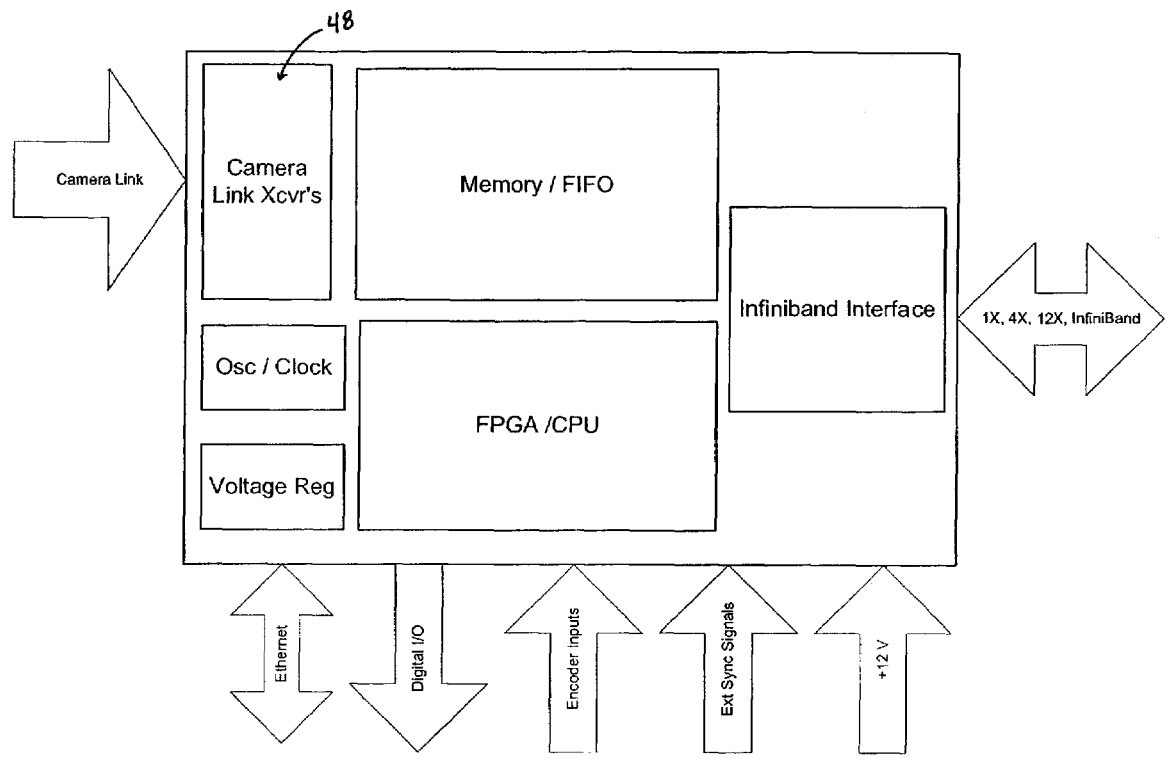

On Board Functionality:
1. Convert Camera Link signals to digital
2. Multiple flat field correction on per pixel basis
3. Image warping to correct optical distortion
4. Image scaling and cropping
5. FIFO for buffering many images
6. Image processing for light control
7. Image defect detection
8. Encoder line and window triggering
9. Distribution of images to processing nodes via Infiniband
10. Image flipping, tap flipping, and rotation
11. Generation of sync signals and other control siganls external of board Camera Link to Infiniband
Frame Grabber
(Advanced)

FIG. 2A

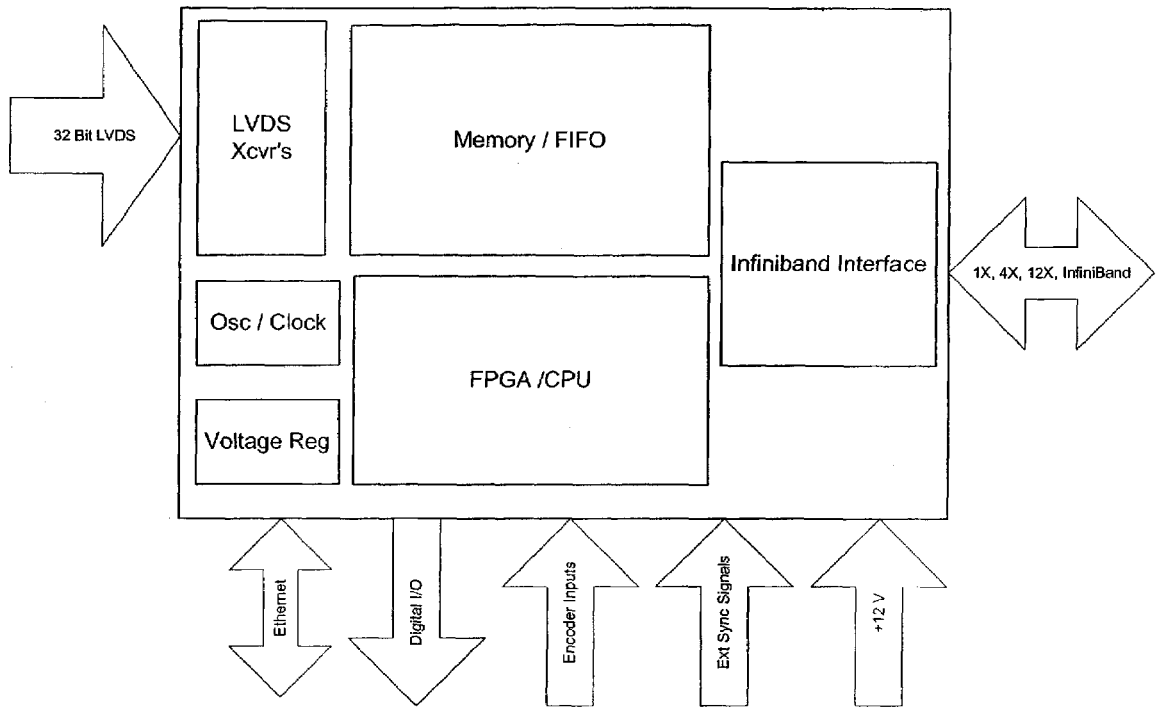

On Board Functionality:
1. Convert LVDS signals to digital
2. Multiple flat field correction on per pixel basis
3. Image warping to correct optical distortion
4. Image scaling and cropping
5. FIFO for buffering many images
6. Image processing for light control
7. Image defect detection
8. Encoder line and window triggering
9. Distribution of images to processing nodes via Infiniband
10. Image flipping, tap flipping, and rotation
11. Generation of sync signals and other control siganls external of board LVDS to Infiniband Frame Grabber (Advanced)

FIG. 2B

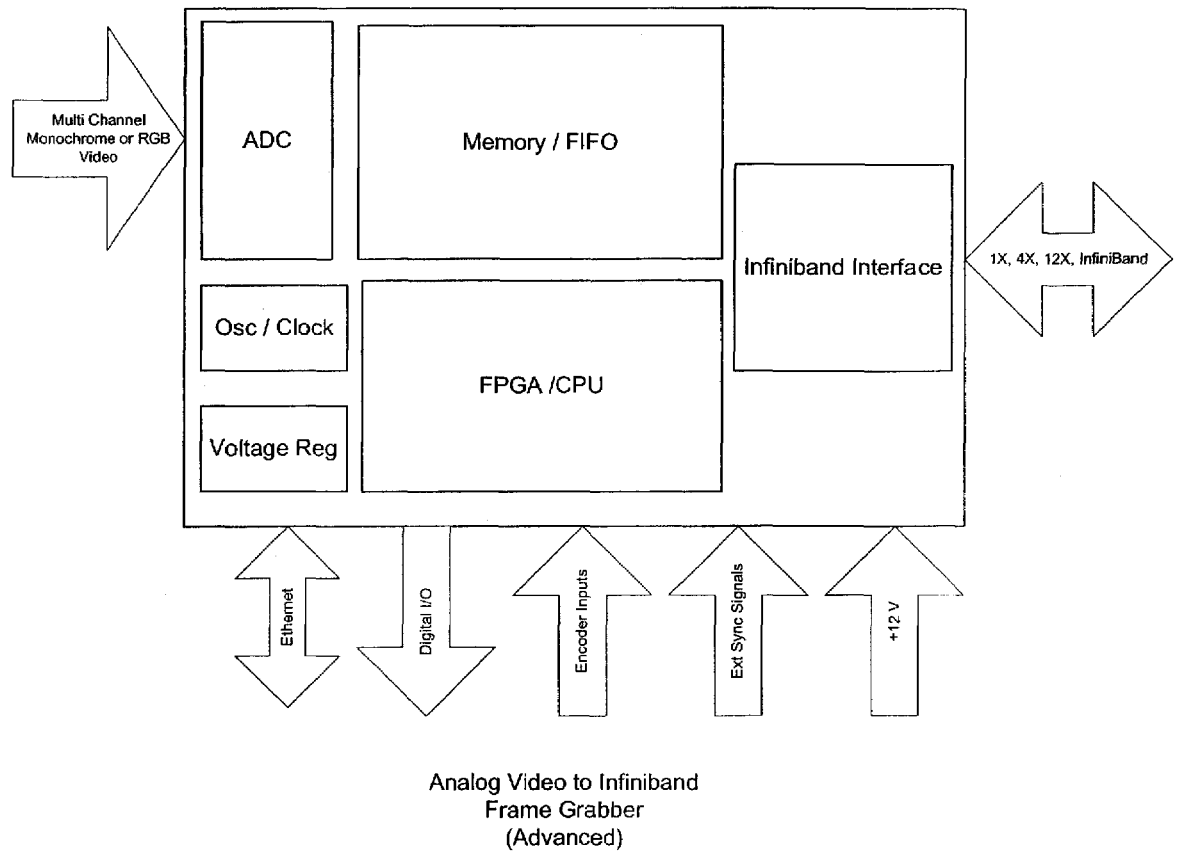

Analog Video to Infiniband
Frame Grabber
(Advanced)

On Board Functionality:
1. Convert Monochrome or RGB video to Digital
2. Multiple flat field correction on per pixel basis
3. Image warping to correct optical distortion
4. Image scaling and cropping
5. FIFO for buffering many images
6. Image processing for light control
7. Image defect detection
8. Encoder line and window triggering
9. Distribution of images to processing nodes via Infiniband
10. Image flipping, tap flipping, and rotation
11. Generation of sync signals and other control siganls external of board

FIG. 2C

DATA TRANSFER DEVICE WITH DATA FRAME GRABBER WITH SWITCHED FABRIC INTERFACE WHEREIN DATA IS DISTRIBUTED ACROSS NETWORK OVER VIRTUAL LANE

CROSS REFERENCE TO RELATED APPLICATIONS

This application cross references and incorporates by reference U.S. Provisional Patent Application Nos. 60/375,321; 60/375,488 and 60/375,366, all filed on Apr. 25, 2002.

BACKGROUND OF THE INVENTION

1. Technical Field

The present invention relates to methods and devices for acquiring and processing data from frame grabbers or other data grabbing devices.

2. Background Information

Currently, devices called frame grabbers reside in computers for the sole purpose of reading data from a digital camera. At least three forms of the devices currently exist; analog, digital, and camera link. Current problems with frame grabbers today include limited bandwidth, compatibility with the computer, limited slot count within the computer to install a frame grabber, cost, and limited distribution of image data for processing.

SUMMARY OF THE INVENTION

The present invention is a standalone device, which digitizes the analog, digital, or Camera Link signal and communicates via a switched fabric interface, such as InfiniBand, Star Fabric, or PCI Express.

BRIEF DESCRIPTION OF THE DRAWINGS

Preferred embodiment of the invention, illustrative of the best mode in which applicant has contemplated applying the principles, are set forth in the following description and are shown in the drawings and are particularly and distinctly pointed out and set forth in the appended claims.

FIGS. 2A, 2B and 2C are another embodiment of the present invention; and

DETAILED DESCRIPTION OF THE PREFERRED EMBODIMENT

Current frame grabbers reside in computers for the sole purpose of reading data from a digital camera but are limited in functionality due to limited bandwidth, compatibility with the computer, limited slot count within the computer to install a frame grabber, cost, and limited distribution of image data for processing. The novel approach and device of the current invention is to create a standalone device which digitizes the analog, digital, or Camera Link signal and communicates via a switched fabric network interface, such as InfiniBand, Star Fabric, or PCI Express, or the like.

A switched fabric network is a network between two or more devices. The fabric enables direct private transfer of data over one or more virtual lanes that are defined between any two or more devices. Furthermore, a switched fabric network allows remote direct memory access between devices. Thereby, only one device need manage the transaction.

A computer connected via the InfiniBand network could request an image capture from the device and the data would be transferred through the switch. InfiniBand is currently capable of up to 30 Gbps per link, and is expected to continue to increase faster than processing units, and uses industry standard connectors and cables between devices. This approach would enable higher bandwidth, reduce computer compatibility problems, enable image distribution, and potentially reduce cost.

The novel approach is a frame grabber that employs a switched fabric network interface integrated within digitizing electronics for acquiring standard camera data to form a complete solution. This allows for high speed efficient distribution and processing of the data in real time.

Figure 1A:
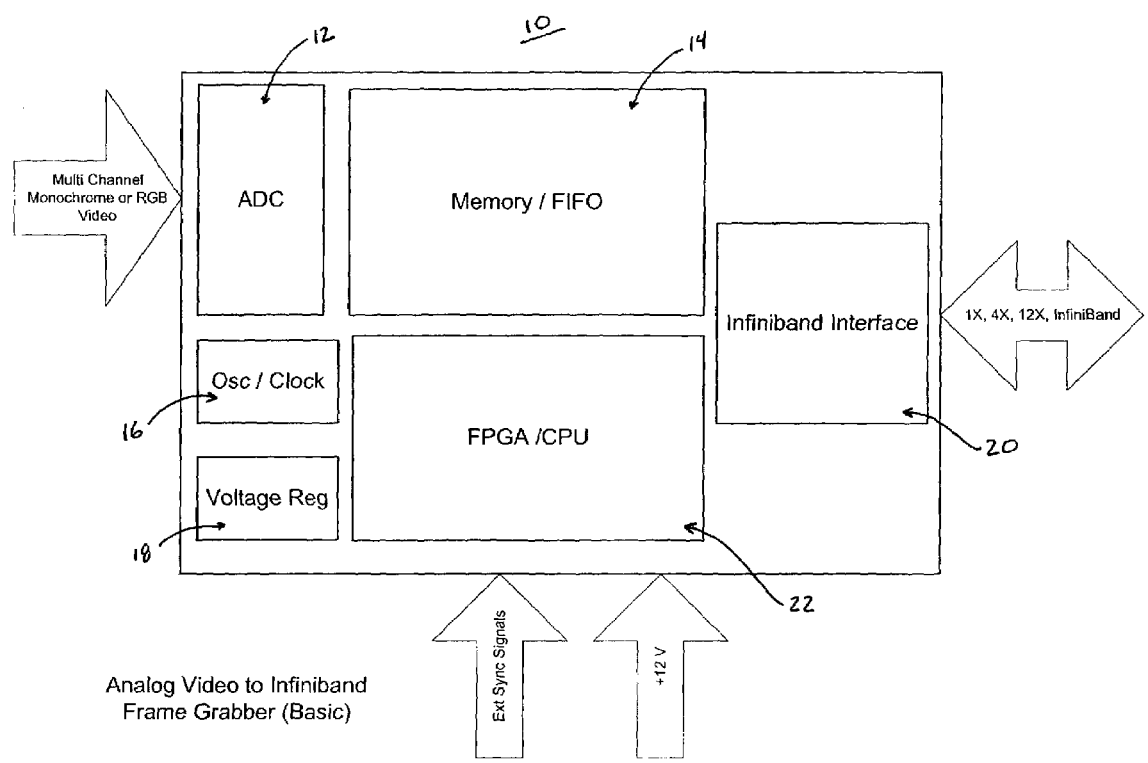
FIGS. 1A, 1B and 1C are one embodiment of the present invention.
Figure 1B:
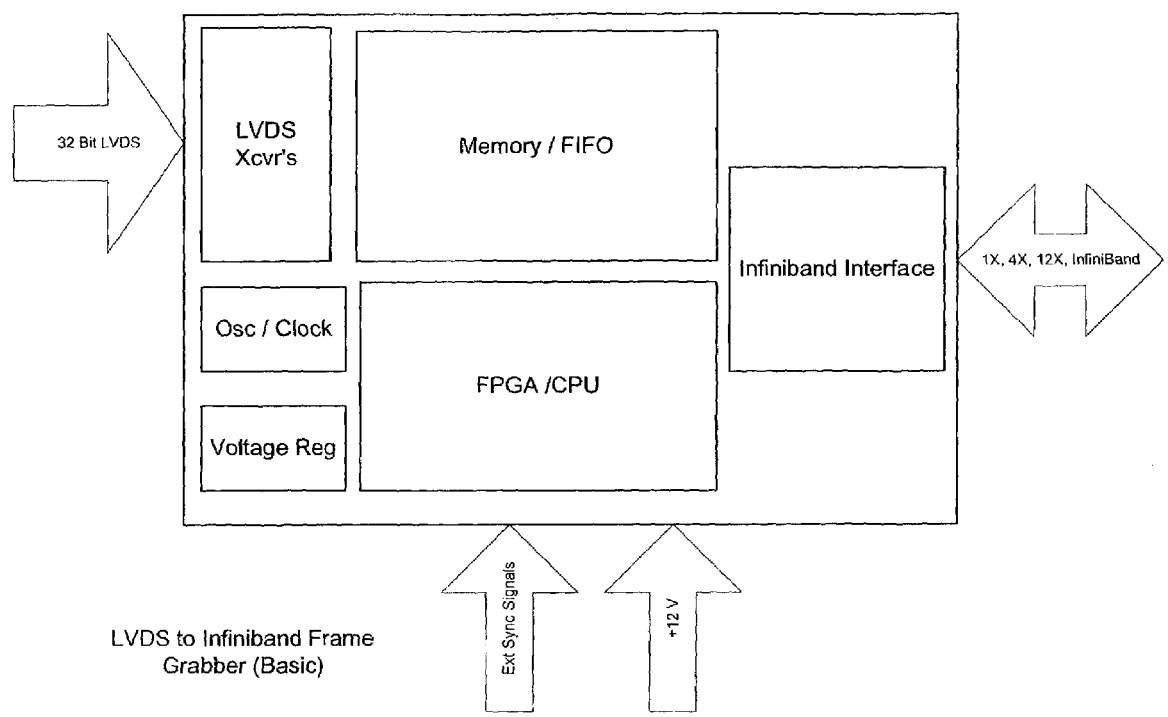
Figure 1C:
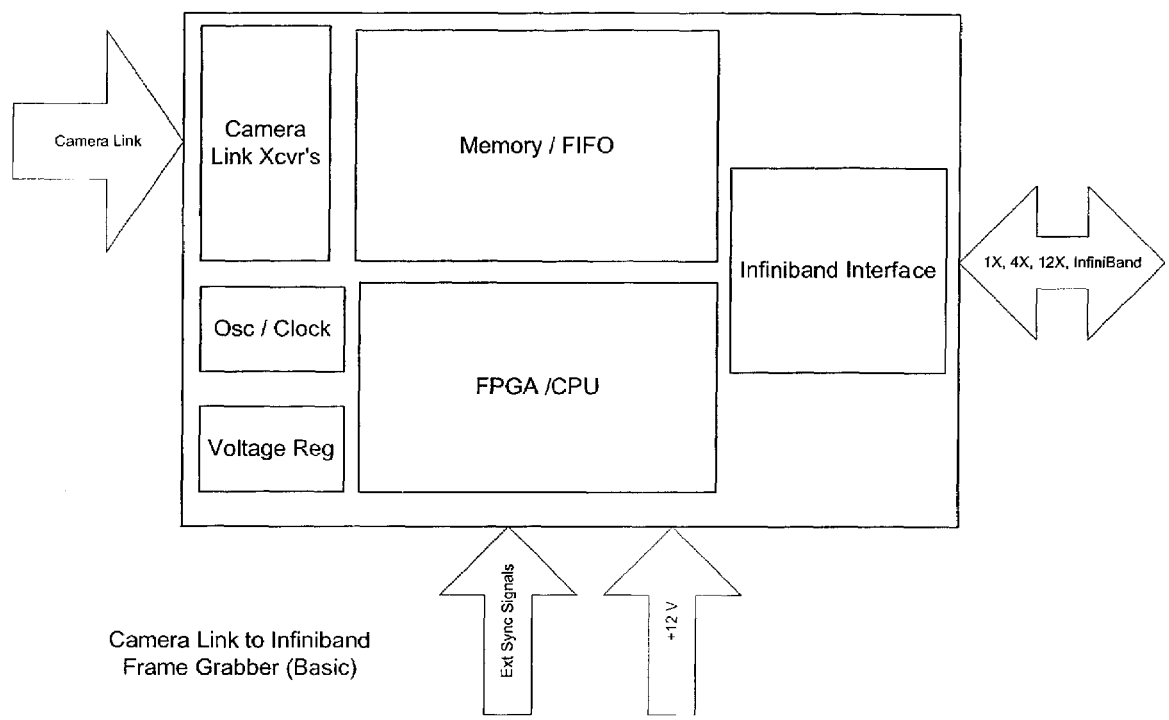

In one embodiment as shown in FIG. 1A which is one example of the present invention, the novel frame grabber 10 includes an analog-to-digital converter (ADC) 12, memory 14, an oscillator or clock 16, a voltage regulator 18, a switched fabric network interface 20 such as an InfiniBand interface, and a field programmable gate array (FPGA) or CPU 22. Various possible inputs and outputs therefrom are also shown. This embodiment is showing an analog video feed. FIG. 1B shows the same invention slightly modified for use with low voltage differential signal chip (LVDS) instead of ADC. FIG. 1C shows the same invention slightly modified for use with camera link interface instead of ADC.

The integrated nature of the frame grabber and switch fabric network interface allows for a system where one or multiple computers may be used to process the data from the frame grabber since the frame grabber directs the data rather than one or more of the computers. This allows for significantly more rapid data rates since the data rate of the frame grabber and switched fabric network far exceeds the data rate of the parallel or serial bus and the computer(s) connected thereto.

In yet another embodiment, the frame grabber may be of an advanced type. This is shown in FIG. 2A. In this case, the embodiment is the same as that of FIG. 1A except that it includes a camera link transceiver 48 or like device instead of an ADC. This advanced version frame grabber has additional features or items to enable integration with inspection tools: (1) Ethernet for local network communications and network devices, (2) digital I/O for controlling local I/O, triggering, and synchronization, (3) encoder inputs for synchronizing the camera with positions, (4) large FIFO for image distribution and buffering, and (5) on board CPU for: (a) flat fielding, (b) image warping, (c) image scaling and cropping, (d) image flipping and tap flipping, (e) image processing functions, and (f) other like features.

FIG. 2B shows the same invention slightly modified for use with low voltage differential signal chip (LVDS) instead of camera link interface. FIG. 2C shows the same invention slightly modified for use with ADC instead of camera link interface.

Figure 3:
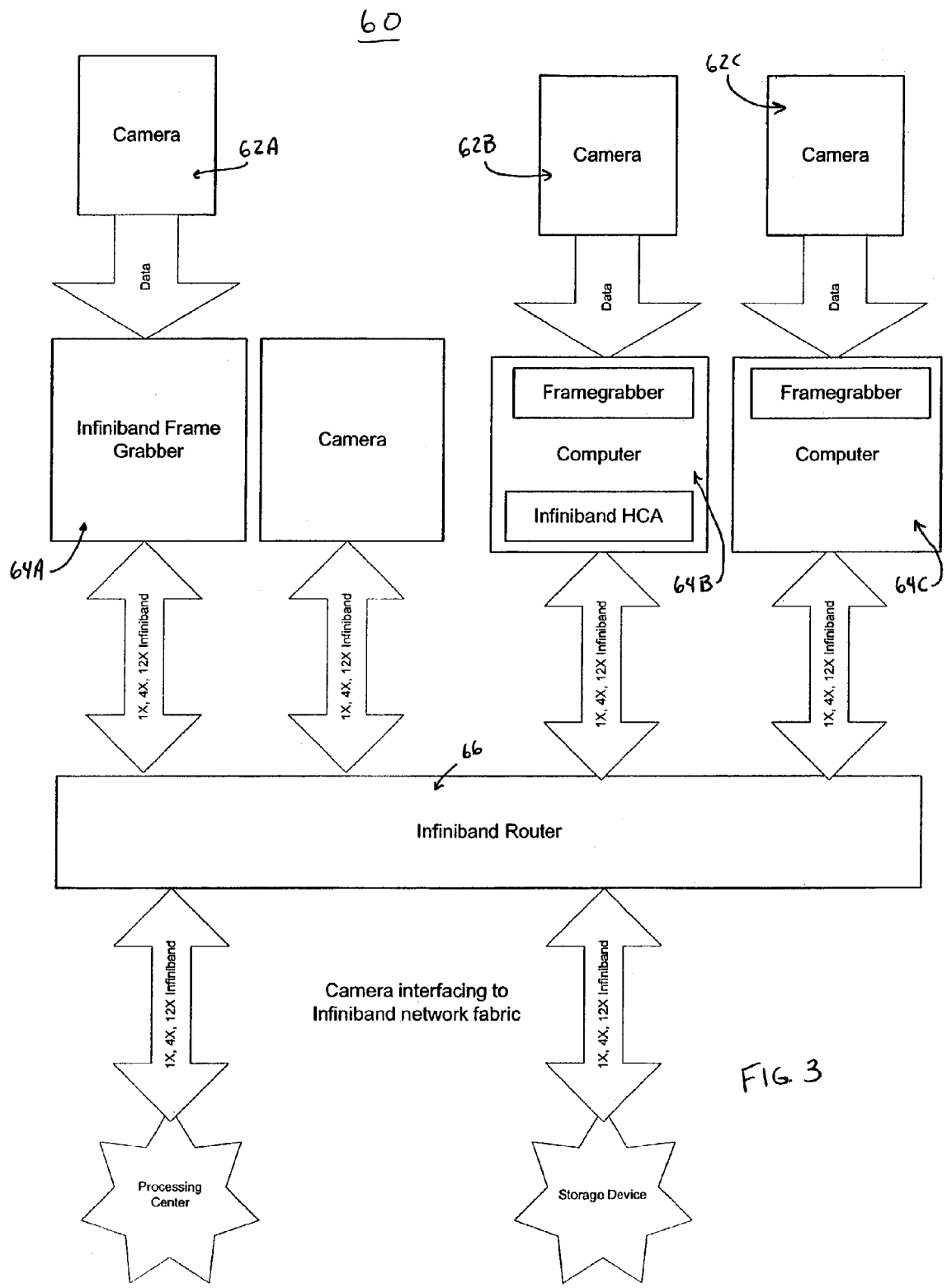
FIG. 3 is a third embodiment of the present invention.

A third embodiment of the present invention is shown in FIG. 3. There currently exists methods for getting data from a camera onto a network for distribution, storage, and processing including the use of a frame grabber in a computer to grab the data into computer memory. In these known methods, the CPU then dispatches the data from memory across the network via Ethernet. This is limited in bandwidth, is subject to interruptions from hardware and software events, and consumes CPU time, and thus this third embodiment was invented which uses a switched fabric interface such as InfiniBand, Star Fabric, or PCI Express to get the camera image data onto the network for distribution. InfiniBand requires no host intervention, is capable of very high data transfer rates, and may or may not be subject to hardware interrupts (depends on the configuration). This embodiment is shown in FIG. 3 in one version although other versions are contemplated with different numbers and configurations. The camera data network 60 of this third embodiment includes a plurality of cameras (62A, 62B, 62C), optional data grabber systems (64A, 64B, 64C), and a switched fabric network router 66 such as an InfiniBand router. One version of data grabber system is 64A which is an InfiniBand frame grabber. Another version of data grabber system is 64B which is a frame grabber, computer and InfiniBand Host Control Adapter (HCA) coupled together. A third version of data grabber system is 64C which is a frame grabber coupled to a computer.

In this third embodiment of the present invention, the system or camera data network 60 is useful in gathering data from multiple cameras or other sensor, optionally grabbing frames or images, and optionally using switched fabric networks to direct and distribute the data.

Accordingly, the invention as described above and understood by one of skill in the art is simplified, provides an effective, safe, inexpensive, and efficient device, system and process which achieves all the enumerated objectives, provides for eliminating difficulties encountered with prior devices, systems and processes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the invention's description and illustration is by way of example, and the invention's scope is not limited to the exact details shown or described.

Having now described the features, discoveries and principles of the invention, the manner in which it is constructed and used, the characteristics of the construction, and the advantageous, new and useful results obtained; the new and useful structures, devices, elements, arrangements, parts and combinations, are set forth in the appended claims.

What is claimed is:

1. A data transfer device comprising:
    at least one frame grabber including a data port and a switched fabric interface, the data port configured to receive data from at least one input device; and
    a data router communicating with the data port and configured to distribute the data to a plurality of external devices;
    wherein the switched fabric interface transfers the data over at least one virtual lane from the data port to the data router for distribution across a network.

2. The data transfer device of claim 1, wherein at least one of the external devices is a network device.

3. The data transfer device of claim 1, wherein the data port is an analog to video port.

4. The data transfer device of claim 1, wherein the data port is a low voltage differential signal chip port.

5. The data transfer device of claim 1, wherein the data port is a camera link port including a CameraLink interface configured to receive image data.

6. The data transfer device of claim 1, wherein the data router comprises a switched fabric network router.

7. The data transfer device of claim 1, wherein the switched fabric interface is configured to convert an analog signal to a digital signal.

8. The data transfer device of claim 1, further comprising:
    at least one of a memory bank for image storage, an Ethernet interface, a digital input and output device, a processing unit, and an encoder input.

9. The data transfer device of claim 1, further comprising:
    a plurality of cameras; and
    a data grabber system communicating with the at least one frame grabber;
    wherein the data port receives input data from the plurality of cameras and the data grabber system communicates output data to the data router.

10. The data transfer device of claim 9, wherein the data grabber system includes an InfiniBand frame grabber.

11. The data transfer device of claim 9, further comprising:
    a second frame grabber; and
    a computer communicating with the second frame grabber and the data router.

12. The data transfer device of claim 11, further comprising:
    an InfiniBand host control adapter communicating with the computer.

13. The data transfer device of claim 1, wherein the at least one virtual lane communicates between the at least one input device and at least one of the external devices.

14. The data transfer device of claim 1, wherein the switched fabric interface enables remote direct memory access between the at least one input device and at least one of the external devices.

* * * * *